(No Model.)
R. ERGANG.
APPARATUS FOR COOLING AND AERATING BREWERS' WORTS.
No. 417,911. Patented Dec. 24, 1889.
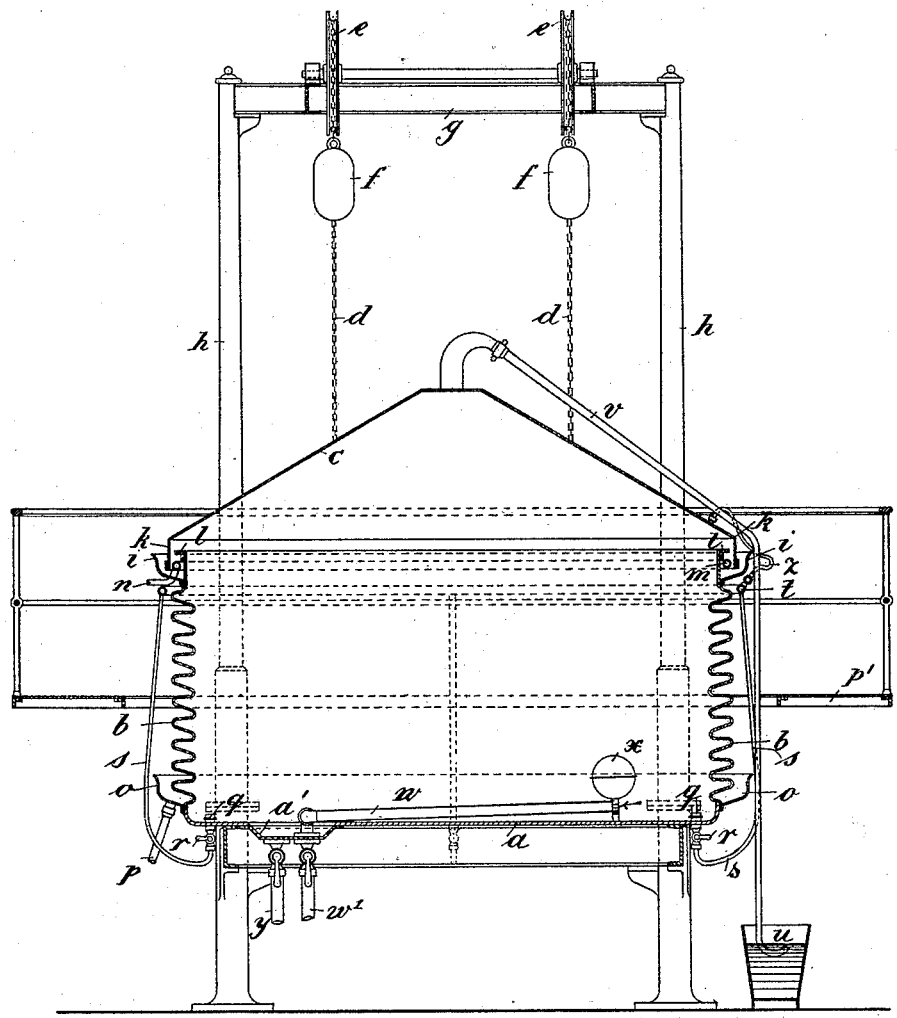
WITNESSES.
John Becker
C. K. Fraser.
INVENTOR.
Richard Ergang,
By his Attorneys,
Arthur C. Fraser & Co.

UNITED STATES PATENT OFFICE.

RICHARD ERGANG, OF MAGDEBURG, PRUSSIA, GERMANY, ASSIGNOR TO F. ERGANG, OF SAME PLACE.

APPARATUS FOR COOLING AND AERATING BREWERS' WORTS.

SPECIFICATION forming part of Letters Patent No. 417,911, dated December 24, 1889.

Application filed April 29, 1889. Serial No. 309,025. (No model.)

*To all whom it may concern:*

Be it known that I, RICHARD ERGANG, residing at Magdeburg, in Prussia, Germany, have invented certain Improvements in Apparatus for Cooling and Aerating Brewers' Worts, of which the following is a specification.

My invention relates to apparatus for cooling and aerating brewers' worts; and it consists in the improved construction of a refrigerating-vessel having corrugated sides down which water is caused to trickle, the water being supplied from a trough into which it is fed, said trough also constituting the sealing-trap for the cover of the vessel, cool sterile air being at the time forced through the wort for the purpose of oxygenating the wort and preventing the growth of micro-organisms therein, especially during warm weather, and also for assisting the refrigeration.

The object of my invention is to provide for the rapid cooling of the wort by using the corrugated sides of the vessel as a cooling-surface down which the water trickles. The peculiarity of the arrangement is, that the supply-pipe (which discharges the cooling-water into an upper rim or trough from which the water overflows and trickles down) consists of a circular sprinkling-pipe fixed underneath and within the cover of the vessel, which rests within said rim or trough and is sealed thereby. The water thus renders the cover air-tight and flows regularly over the edge of the trough or drips through holes therein down over the corrugated surface of the vessel. The advantage of having the discharge-pipe underneath and within the cover of the vessel is, that not only is the trough always filled with water, but it is kept continually clean, as the condensed water flowing from the cover and the scum from the inside of the vessel are at once carried away by the water.

The accompanying drawing represents a vertical section of an apparatus for cooling and aerating brewers' worts, constructed according to my invention.

This cooling-vessel consists of the bottom part $a$, the sides $b$, and the cover $c$, having chains $d$ passing over chain-wheels $e$, and having counter-weights $f$ attached thereto. The chain-wheels are mounted on a frame $g$, supported by columns $h$, which latter serve as guides to the cover when lifting or lowering the same. The sprinkling-pipe $m$ is fixed in the rim or trough $i$, between the rim $k$ of the cover and the top part $l$ of the sides of the vessel, and is supplied from a pipe $n$. The water flowing over the edge of or through holes in the trough $i$ trickles down the corrugated surface $b$ into a trough $o$, whence it is conducted away through a pipe $p$. By this arrangement the inside of the vessel is entirely clear, and can therefore be easily cleaned. A vessel of this construction, having a capacity of not more than fifty to sixty hectoliters, affords, without necessitating impracticably deep corrugations, a refrigerating-surface of large area.

The sterile air is introduced through four or five perforated nozzles $q$, near the bottom of the vessel. The delivery is regulated by cocks or valves $r$. The nozzles are all connected by tubes or hose-pipes $s$ with a single air-supply tube $t$, which is situated near to or above the top of the vessel for the purpose of preventing the wort from entering it. The vessel is filled by lifting the cover $c$ and introducing the supply-tube. The air, which is inside the cover, is rendered sterile through the heat of the wort; but should it be desirable to entirely prevent the contact of the wort with impure air the vessel could, without raising the cover, be filled through a suitable opening made therein, it having been previously blown out with steam or with sterile air.

The air is supplied either by means of an air-pump or a Root's blower, and it is rendered sterile in the usual manner by filtering it through wadding, an arrangement being provided for steaming and drying the latter to prevent the growth of the organisms retained by the filter.

The temperature of the air introduced for the oxygenation of the wort is regulated by using a branch pipe with a spiral tube and an ice-vessel, through which part or, if necessary, the whole of the air-current can be made to pass and its temperature be thereby brought down to about 3° centigrade. The sterile air blown into the vat through the nozzles $q$ thus co-operates with the refrigeratingwater and accelerates the cooling of the wort. Moreover, the portion of wort nearest the corrugated surface *b* of the vessel, being more quickly cooled, together with the action of the air-current from the nozzles, causes a vigorous circulation in the liquid, and thus renders the use of agitating apparatus entirely unnecessary.

If my improved apparatus be placed in a cool situation, no more time nor cooling-water will be required than is necessary with the best apparatus hitherto in use. During the cooling process the air escapes through a tube *v* at the top of the cover, dipping into a water-vessel *u*.

The cooled wort is drawn off through a tube *w*, provided with a float *x* and connected by a movable joint to the outlet-tube *w'*, having a draw-off cock. By this means the wort is always drawn off from the surface and the sediments are retained in the bottom of the vessel.

The pipe *w'* is fitted in a recess *a'* in the bottom of the vessel, as also are two other pipes, one of which *y* is for the purpose of drawing off the turbid wort at the bottom and the other for allowing the water used for cleaning the vessel to pass out. In the drawings only one of the two pipes is shown, the other being hidden from view.

It is advantageous to connect the pipe *t* by means of a tap and a flexible tube *z* to another tap or a short pipe attached to the lower part of the cover *c*, in order to allow of introducing sterile air at the top of the vessel when drawing off the wort.

The vessel should be placed on a stand similar to that represented in the drawings, to afford easy access to the lower parts for cleaning, and it should have a platform, to facilitate the cleaning of the upper and inner parts.

I claim as my invention—

1. In an apparatus for cooling brewer's wort, a refrigerating-vessel having corrugated outer walls and a water rim or trough at or near its upper edge, in combination with a water-supply pipe which supplies water constantly to said rim or trough, and a cover for said vessel, which rests in said rim or trough and is sealed by the water therein, substantially as set forth.

2. In an apparatus for cooling brewer's wort, a refrigerating-vessel having corrugated outer walls and a water rim or trough near its upper edge, in combination with a perforated water-supply pipe consisting of a sprinkling-pipe lying in said rim or trough throughout the length thereof, said pipe constantly supplying water to said trough, and a cover for said vessel, which rests in said rim or trough and is sealed by the water therein, substantially as set forth.

3. In an apparatus for cooling brewer's wort, a refrigerating-vessel having corrugated outer walls and a water rim or trough near its upper edge, in combination with a cover for said vessel, which rests in said rim or trough and is sealed by the water therein, and a perforated water-supply sprinkling-pipe extending around said rim or trough and lying therein between the cover and the refrigerating-vessel, said supply-pipe constantly supplying water to said trough, substantially as set forth.

In testimony whereof I affix my signature in presence of two witnesses.

RICHARD ERGANG.

Witnesses:
F. VON VERSEN,
A. DEMELIUS.